United States Patent

[11] 3,624,427

[72] Inventor Eise Carel Dijkmans
Emmasingel, Eindhoven, Netherlands

[21] Appl. No. 19,437
[22] Filed Mar. 13, 1970
[45] Patented Nov. 30, 1971
[73] Assignee U.S. Philips Corporation
New York, N.Y.
[32] Priority Mar. 22, 1969
[33] Netherlands
[31] 6904458

[54] PULSE TRANSMISSION DEVICE INTEGRATED IN A SEMICONDUCTOR BODY
5 Claims, 10 Drawing Figs.

[52] U.S. Cl. .......... 307/303, 307/213, 307/221, 307/271, 325/42, 325/137, 328/60, 328/61
[51] Int. Cl. .......... H03k 5/00, H03k 3/26
[50] Field of Search .......... 307/213, 221, 271, 295, 303; 328/60, 61, 63, 37, 165, 167; 325/137, 163, 323, 42, 127, 137

[56] References Cited

UNITED STATES PATENTS

| | | | |
|---|---|---|---|
| 3,500,215 | 3/1970 | Leuthold et al. | 328/63 X |
| 3,356,860 | 12/1967 | Norman | 307/221 |
| 3,219,845 | 11/1965 | Nieh | 307/221 X |
| 3,295,072 | 12/1966 | Kessel | 325/137 X |
| 3,297,951 | 1/1967 | Blasbalg | 328/37 |
| 3,343,093 | 9/1967 | Gerwen | 325/42 X |
| 3,409,832 | 11/1968 | Kessel | 325/137 |
| 3,421,088 | 1/1969 | Salley et al. | 325/163 |
| 3,524,023 | 8/1970 | Whang | 325/42 X |
| 3,454,785 | 7/1969 | Norman et al. | 307/303 X |

*Primary Examiner*—Stanley T. Krawczewicz
*Attorney*—Frank R. Trifari

ABSTRACT: A pulse transmission device integrated in a semiconductor body comprising an output filter is formed from a shift register having a number of shift register elements which are coupled to a combination device through respective attenuation networks. Each shift register element and its respective attenuation network is formed as a topologic unit with the topologic units distributed in parallel rows. Various connections are made through tracks. The use of topologic units minimizes mutual cross talk phenomena both capacitive and galvanic in nature.

INVENTOR.
ELSE C. DIJKMANS
BY
AGENT

INVENTOR.
ELSE C. DIJKMANS

BY

AGENT

INVENTOR.
ELSE C. DIJKMANS
BY
[signature]
AGENT

INVENTOR.
ELSE C. DIJKMANS
BY
Frank R. Trifari
AGENT

INVENTOR.
ELSE C. DIJKMANS
BY
AGENT

INVENTOR.
ELSE C. DIJKMANS
BY
AGENT

INVENTOR.
ELSE C. DIJKMANS
BY
AGENT

PULSE TRANSMISSION DEVICE INTEGRATED IN A SEMICONDUCTOR BODY

The invention relates to a pulse transmission device integrated in a semiconductor body, comprising an output filter which is fed by bivalent pulses which occur in the rhythm of a clock frequency, which output filter is formed by a shift register having a number of shift register elements comprising of bistable triggers the contents of which are shifted at a shift frequency which is equal to an integer multiplied by the clock frequency, the output signal of the output filter being derived from a combination device which is connected through attenuation networks composed of resistors connected to the outputs of the shift register elements, while other connecting points are provided on the semiconductor body for the pulse signals to be transmitted and the shift frequency, and supply connecting points having a mutually different potential.

Such a device for the transmission of pulses provides special advantages as already extensively described in prior applications in the name of the applicant. By suitable proportioning of the attenuation networks connected to the shift register elements of the output filter the phase versus-frequency characteristic required for the transmission of pulses can be obtained in a simple manner in addition to the desired amplitude-versus-frequency characteristic. Thus, for example, for obtaining the linear phase-versus-frequency characteristic, which is important for the transmission of pulses the attenuation networks should be made pairwise equal starting from the ends of the shift register (compare U.S. Pat. No. 3,500,215 issued Mar. 10, 1970. Inventor P. Leuthold et al. for improvements in "Bivalent Pulse Signals").

In addition such devices are distinguished by their special flexibility of use. In fact, on the one hand such devices are also used as a filter for analog signals which are first converted in an analog-to-digital converter into a pulse code having bivalent pulses and these bivalent pulses are applied to a decoder after the filter process in the shift register provided with attenuation networks, so that the analog signal filtered in accordance with the desired filter characteristic (compare prior U.S. Pat. No. 3,521,170 issued July 21, 1970 is obtained at the output of the decoder. On the other hand such devices may be used universally for pulse modulation by modulating in the manner described in prior U.S. patent application Ser. No. 728,706 filed May 13, 1968 the pulses to be transmitted in a digital modulator on a rectangular carrier oscillation at a frequency which is an integer multiplied by half the clock frequency of the pulses to be transmitted. For an arbitrary method of modulation, for example, amplitude modulation, phase modulation or frequency modulation it is then possible to adjust to a desired manner of transmission, for example, double sideband, vestigial sideband or single-sideband transmission. As is described in prior U.S. application Ser. No. 840,409 filed July 9, 1968 it is even possible with this device to completely correct for the influence of unwanted modulation products by using a correction network at a carrier frequency which is low relative to the clock frequency, so that a transmission of pulses of optimum quality is achieved in this case.

The devices described are in principle suitable for complete integration in a semiconductor body because these devices are exclusively built up from logic circuits and resistors without using reactive elements. However, when using the devices in practice difficulties were encountered as a result of the fact that a great number of attenuation networks, whose transmission factors mutually differ to a great extent, for example, 40 db., is required for obtaining an accurate filter characteristic. For the compact structure in a semiconductor body while using a great number of attenuation networks and hence also a great number of shift register elements it was found that special attention had to be paid to the reliable operation and to the reduction of a disturbing influence due to unwanted phenomena such as, for example, retroaction effects, inequalities in the components used and crosstalk phenomena.

It is an object of the invention to provide an advantageous structure of an integrated pulse transmission device of the type described in the preamble in which the disturbing influence due to the above-mentioned unwanted phenomena is reduced to a great extent while maintaining an excellent reliability.

The device according to the invention is characterized by the combination of the following measures:

1. Each shift register element in the form of a bistable trigger is constructed to form a topologic unit in the semiconductor body together with the attenuation network connected to the output circuit of the bistable trigger.
2. The shift register elements and associated attenuation networks constructed to form topologic units along which a shift frequency track is led connected to the connecting point for the shift frequency, are distributed in the semiconductor body over mutually parallel rows having a limited number of topologic units which parallel rows are mutually bounded by parallel supply tracks which are alternately connected through collective supply tracks facing each other to the supply connecting points having a different potential.
3. The bistable triggers incorporated as shift register elements in the topologic units are of the constant supply current loading type.
4. The attenuation networks associated with the different topologic units are connected to the combination device through a combination track which is common for the attenuation networks.

The applicant is the first to produce a binary information pulse transmission device which is completely integrated in a semiconductor body due to the well-ordered structure described by which a pulse transmission of excellent quality is obtained even up to pulse frequencies of many MHz as has been found from the waveforms observed.

In order that the invention may be readily carried into effect a few embodiments thereof will now be described in detail by way of example with reference to the accompanying diagrammatic drawings in which:

FIG. 3 shows the waveforms associated with FIG. 2 while

Figure 2:
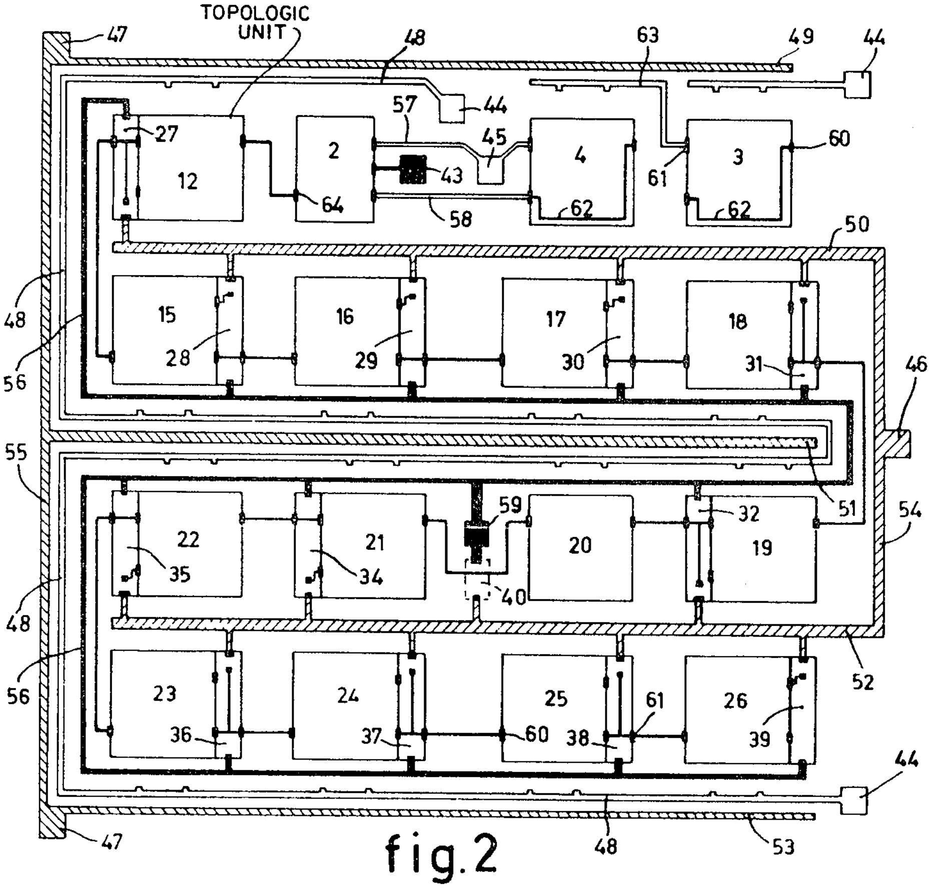
Figure 4A:
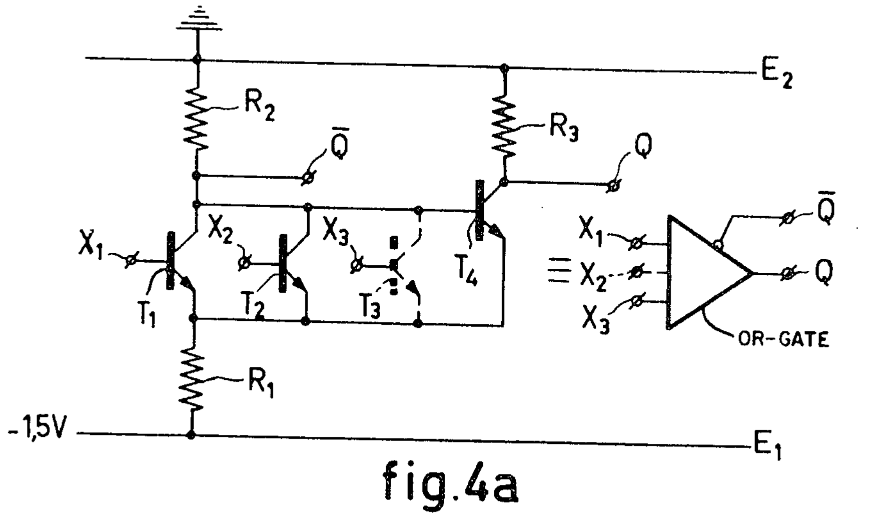

FIG. 4*a*, *b*, and 4*c* show a few detailed circuit diagrams of the elements used in the transmission device of FIG. 2.

Figure 5:
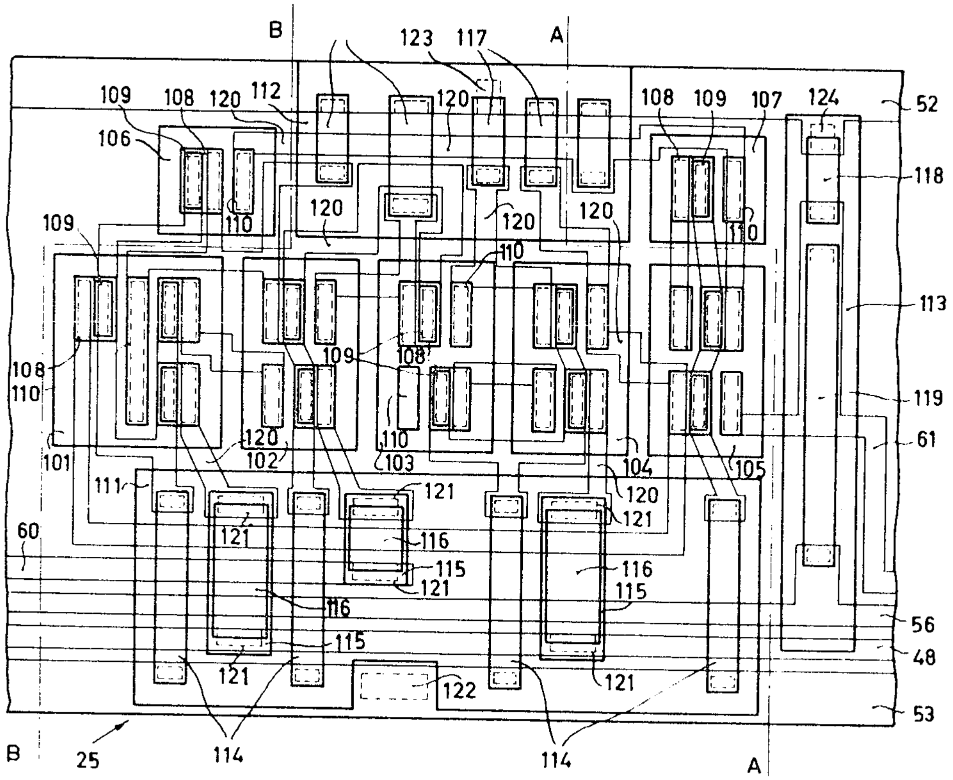
Figure 6:
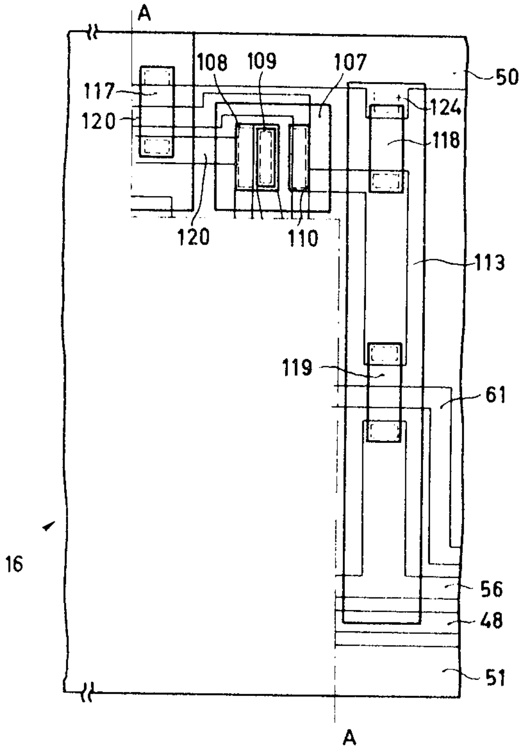
Figure 7:
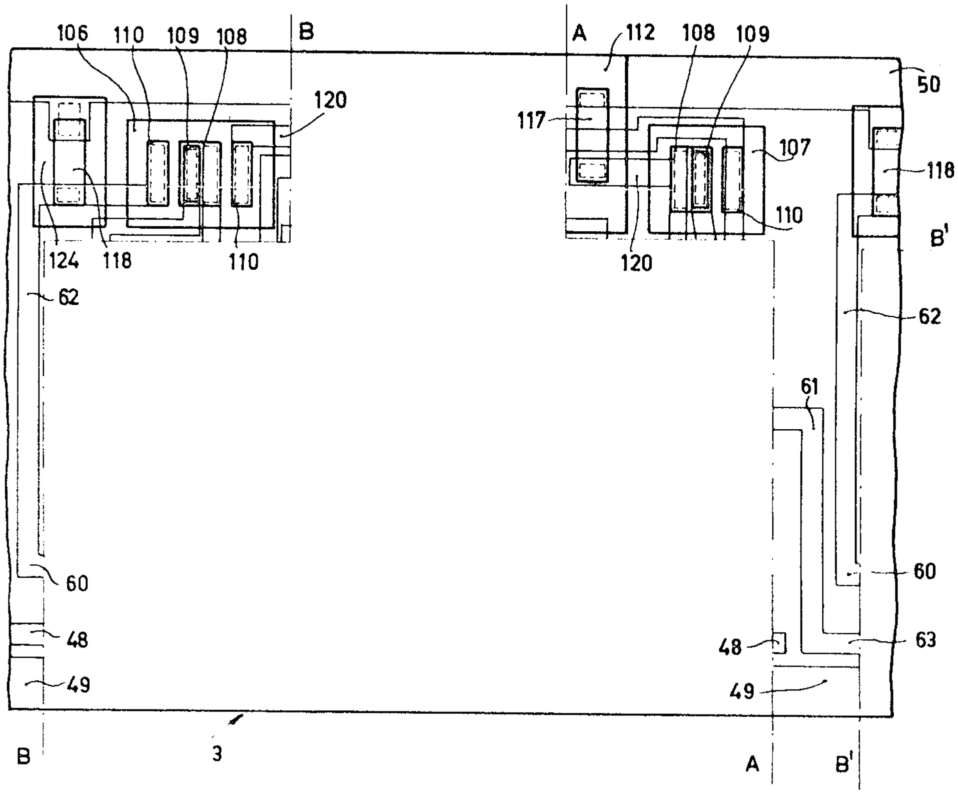
Figure 8:
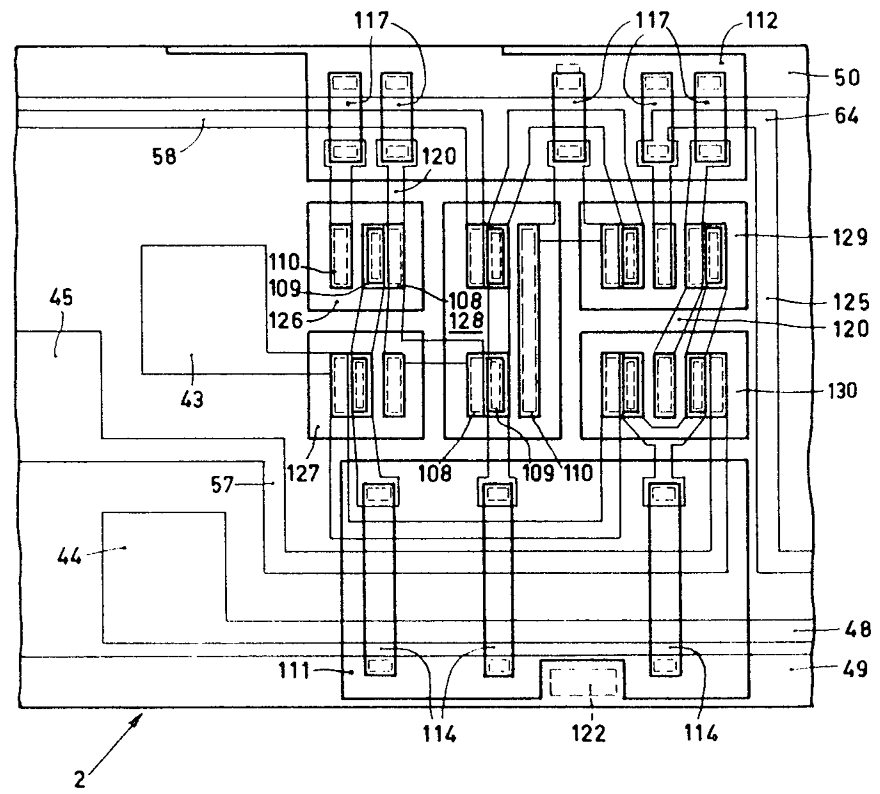

FIG. 5 is a diagrammatic plan view of part of the integrated transmission device of FIG. 2, particularly of the block 25, 38 which is diagrammatically shown in FIG. 2 while FIG. 6 diagrammatically shows part of a plan view of, for example the block 16, 29, FIG. 7 diagrammatically shows a plan view of the two-to-one divider 3 of FIG. 2 and FIG. 8 diagrammatically shows a plan view of the modulator 2 of FIG. 2.

Figure 1:
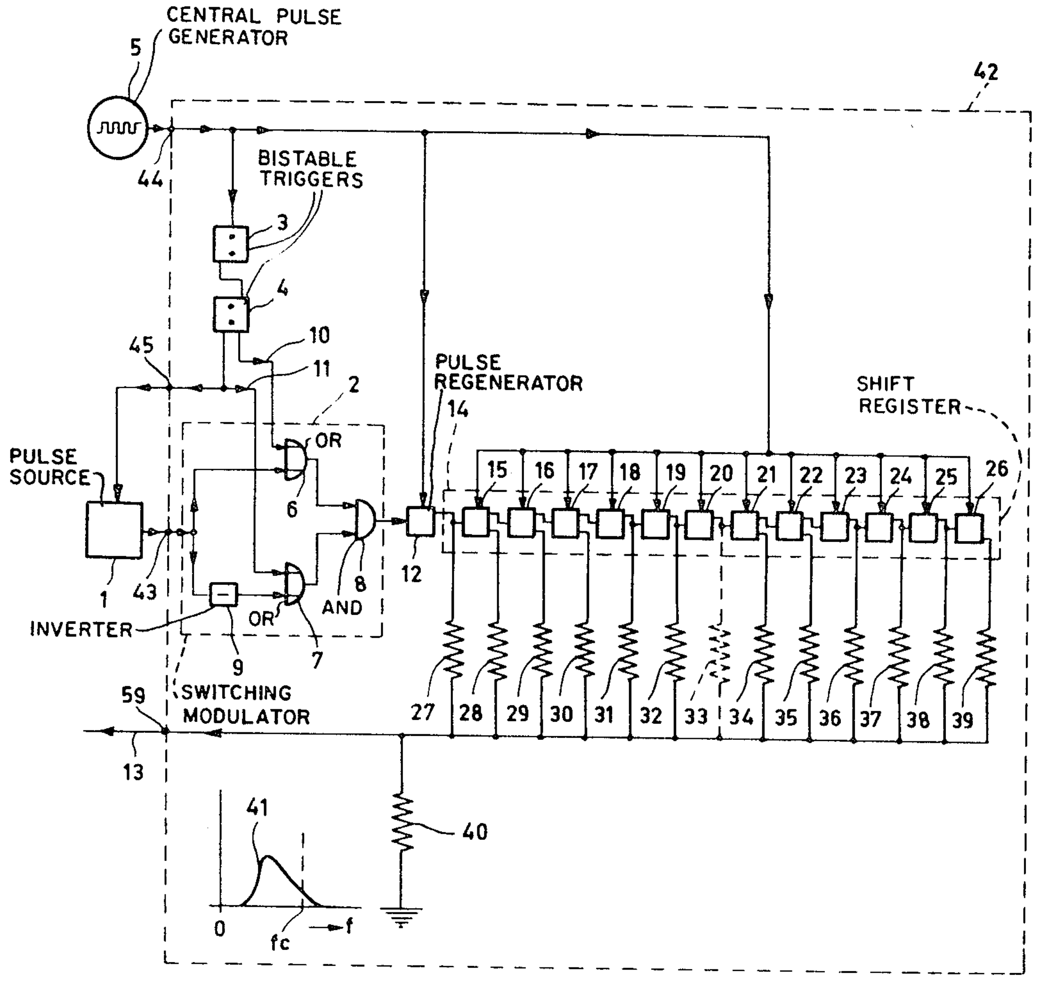
FIG. 1 shows a block diagram of a transmission device for the transmission of pulses and FIG. 2 shows diagrammatically the embodiment according to the invention integrated in a semiconductor body.

FIG. 1 shows a transmission device for vestigial sideband transmission of binary pulse signals in a prescribed frequency band of, for example, 600–3,000 Hz. at a transmission speed of, for example, 2,400 Baud. The binary pulses which originate from a pulse source 1 and the instants of occurrence of which coincide with series of equidistant clock pulses having a frequency of $f_b$ = 2,400 Hz. are applied as modulation device signals to a switching modulating having 2 so as to modulate therein a rectangular carrier oscillation at a frequency of $f_c$ = 2,400 Hz. The clock pulses and the rectangular carrier oscillation are both derived from two successive bistable triggers connected as two-to-one dividers 3, 4 which are connected to a central pulse generator 5 having a pulse frequency $f_0$ = 9,600 Hz.

In the embodiment shown the switching modulating device 2 is formed by two selection gates 6, 7 in the form of OR gates the outputs of which are connected to a selection gate 8 in the form of an AND gate and the pulses originating from the pulse source 1 being applied to the OR-gate 6 directly on the one hand and through an inverter 9 to the OR-gate 7 on the other hand, while also carrier oscillations which mutually differ 180° in phase are applied to the two OR-gates 6, 7 through lines 10, 11, the carrier oscillations being derived from different outputs of the two-to-one divider 4. The rectangular carrier oscillation originating from the two-to-one divider 4 is phase-modulated with the aid of the switching modulating device 2 by the pulse series to be transmitted. Particularly when a pulse from the pulse source 1 to be transmitted is present, the carrier oscillation of the frequency divider 4 will be applied directly through line 10 and through OR-gate 6 to the AND-gate 8, while conversely the inverted carrier oscillation is applied through carrier line 11 and the OR-gate 7 to the AND-gate 8 when a pulse from the pulse source 1 to be transmitted is absent. The output signal of the AND-gate 8 is applied to an output filter through a pulse regenerator 12 in the form of a bistable trigger which is controlled by the pulses from the central pulse generator 5, said output filter being connected through an output line 13 to an output amplifier for further transmission along a transmission cable. The output amplifier is not further shown in the figures.

In order to obtain a device which is particularly advantageous for the transmission of pulses and as already described in prior U.S. patent applications Ser. No. 594,615, filed Nov. 15, 1966 and Ser. No. 728,706, filed May 13, 1968 the output filter is formed by a digital filter which comprises a shift register 14 having a number of shift register elements 15–26 the contents of which are shifted under the control of shift pulses which are derived from the central pulse generator 5. The shift frequency $f_d$ of the shift register 14 is thus derived from the central pulse generator 5 as is the clock frequency $f_b$ and the carrier frequency $f_c$. The shift frequency $f_d$ is in fact derived directly from the central pulse generator 5 and the clock frequency $f_b$ and the carrier frequency $f_c$ are derived after frequency division by a factor of 4 in the frequency dividers 3, 4.

To obtain the desired transfer characteristic of the vestigial sideband type the shift register elements 15–26 in the digital filter are connected through attenuation networks comprising resistors 27–39 to a combination device in the form of a resistor 40 from which the output signals of the transmission device are derived through the output line 13. In this embodiment the shift register elements 15–26 consist of bistable triggers.

The desired transfer function of the transmission device is obtained with the aid of the digital filter by suitably proportioning the respective transfer coefficients $C_{-6}, C_{-5}, C_{-4}, C_{-3}, C_{-2}, C_{-1}, C_0, C_1, C_2, C_3, C_4, C_5, C_6$ of the attenuation networks 27–39 at a given shift period $d = 1/f_d$. The prior U.S. Pat. applications Ser. No. 595,615 filed Nov. 15, 1966 and Ser. No. 728,706, filed May 13, 1968 show that with 2N shift register elements and with attenuation networks which, starting from the ends of the shift register 14 are pairwise equal, their transfer coefficients $C_k$ satisfying $C_{-k}=C_k$ with $k=1, 2, \ldots, N$ a transfer function is obtained whose amplitude-versus-frequency characteristic $\psi(\omega)$ *has the form of*

$$\psi(\omega)=C_0+\sum_{k=1}^{N}2C_k, \cos k\omega d$$

and the phase-versus-frequency characteristic $\Phi(\omega)$ shows an exactly linear variation in accordance with $\Phi(\omega)=-N\omega d$ The amplitude-versus-frequency characteristic thus forms a Fourier series developed in cosine terms, the periodicity $\Omega$ of which is given by:

$\Omega d=2\pi$

If a given amplitude-versus-frequency characteristic $\psi_o(\omega)$ is to be obtained the coefficients $C_k$ in the Fourier series may be determined with the aid of the relation $$C_k=(1/\Omega)\cdot\int_0^{\Omega}\psi_o(\omega)\cdot\cos k\omega d\cdot d\omega$$

The shape of the amplitude-versus-frequency characteristic is fully determined thereby, but the periodical behavior of the Fourier series results in the desired amplitude-versus-frequency characteristic being repeated at a periodicity $\Omega$ in the frequency spectrum thus creating additional pass regions of the transmission device. These additional pass regions are not disturbing in practice since in case of a sufficiently high value of the periodicity $\Omega$ which means: at a sufficiently small value of the shift period $d$, the frequency distance between the desired pass region and the next additional pass region is sufficiently large so that the additional pass regions can be suppressed by a simple suppression filter at the output of the output amplifier without influencing in any way the amplitude-versus-frequency characteristic and the linearity of the phase-versus-frequency characteristic in the desired pass region. The suppression filter is formed, for example, by a low-pass filter consisting of a resistor and a capacitor.

A substantial extension of the applications is obtained in that the inverted pulse signals are derived from the shift register elements which inverted pulse signals also appear at the bistable triggers in the construction of the shift register elements with bistable triggers. As a result it is possible to obtain negative coefficients $C_k$ in the Fourier series. Furthermore an amplitude-versus-frequency characteristic $\psi(\omega)$ in the shape of a Fourier series developed in since terms can be obtained with a linear phase-versus-frequency characteristic. To this end the attenuation networks are again made pairwise equal starting from the ends of the shift register 14, but the central attenuation network 33 has a transfer coefficient $C_0$ which is equal to zero and the inverted pulse signal is applied to the attenuation networks succeeding this attenuation network 33 so that with 2N shift register elements the transfer coefficients $C_k$ satisfy $C_{-k}=-C_k$ with $k=1, 2, \ldots N$.

For the transfer function then applies that $$\psi(\omega)=\sum_{K=1}^{N}2C_k \sin k\omega d$$

$\Phi(\omega)=-N\omega d+\pi/2$ wherein the coefficients $C_k$ in the Fourier series can be determined with the aid of the relation $$C_k=(1/\Omega)\int_0^{\Omega}\psi_o(\omega)\ \sin\cdot k\omega d\cdot d\omega$$

By suitable choice of the transfer coefficients of the attenuation networks any arbitrary amplitude-versus-frequency characteristic can be obtained in this manner with a linear phase-versus-frequency characteristic so that the modulated pulse signals applied to the digital filter can be filtered in any desired manner without introducing phase distortion. Whether for obtaining a certain amplitude-versus-frequency characteristic a Fourier development is chosen in accordance with sine terms or cosine terms, is dependent on the fact in which of these two cases the transfer coefficients $C_k$ of the attenuation networks have their most suitable practical values.

Thus in the embodiment shown wherein the transfer characteristic has the variation shown by the frequency diagram 41 in FIG. 1 the transfer coefficients $C_k$ of the attenuation networks are determined by a Fourier development in accordance with sine terms and the transfer coefficients $C_k$ are successively:

$C_0 = 0$ $C_4 = +9.36$
$C_1 = -4.80$ $C_5 = +42.2$
$C_2 = -7.20$ $C_6 = -50.5$
$C_3 = +17.0$ while the transfer coefficients $C_{-k}$ are given by the relation $C_{-k} = -C_k$.

Once this transfer function is adjusted for an optimum recovery of the original pulse signals, this optimum adjustment is retained also in case of varying operating conditions such as variations in the frequency $f_o$ of the central pulse generator 5 as a result of the congruent variation of the transfer function with the frequency $f_o$, that is to say, if $f_o$ changes by a certain factor both the clock frequency $f_b$, the carrier frequency $f_c$ and the shift frequency $f_d$ change by the same factor with the result that on a frequency scale changed by the same factor the amplitude-versus-frequency characteristic retains its original form and also the phase-versus-frequency characteristic retains its linear variation. The transmission device described shows a particular flexibility in so far that it can be used without difficulty for other pulse speeds. If the pulses to be transmitted have, for example, a clock frequency which is ten times higher, which is thus associated with a frequency of the central pulse generator 5 which is 10 times higher, then the frequency scale of the transfer characteristic will automatically increase by a factor of 10 while retaining the form of the amplitude-versus-frequency characteristic and the linear variation of the phase-versus-frequency characteristic.

FIG. 2 diagrammatically shows the embodiment according to the invention of the transmission device integrated in a semiconductor body as is shown by the broken-line block 42 in FIG. 1 wherein the connecting points for the pulse source 1 are denoted by the reference numeral 43, for the central pulse generator 5 by the reference numeral 44 and for the clock frequency output by the reference numeral 45, while the supply connecting points having a mutually different potential are denoted by the reference numerals 46, 47. The supply connecting point 46, is for example, connected to earth and the supply connecting points 47 are connected to a negative potential source. For the sake of clarity elements corresponding to those of FIG. 1 have the same reference numerals in FIG. 2.

In principle the overall transmission device is eminently suitable for an embodiment integrated in a semiconductor body since as already shown in FIG. 1 it is built up exclusively from logic circuits and resistors. However, practical difficulties were found to occur upon realizing this embodiment because strict requirements had to be imposed on the accuracy and simultaneously special requirements had to be imposed on the heat dissipation. For the sake of the concentrated structure employing a great number of elements within a small surface, for example, 172 resistors and 203 transistors within a surface of 2.7×2.1 mm. the supply voltage is made extremely low and particularly the supply connecting points 46, 47 are connected to a supply voltage of −1.5 v. while an output voltage of 30 mv. occurs at this low supply voltage at the output resistor 40 of the transmission device. In addition a relative accuracy of approximately 1 percent in the ratios of the transfer factors of the attenuation networks 27–39 to the output resistor 40 is desired for a pulse transmission of eminent quality, which transfer factors mutually differ by a factor of at least 10 as is shown by the previously mentioned values of the transfer coefficients $C_k$. For the output voltage of 30 mv. this requirement of accuracy for the separate units means an accuracy of a few hundredths of 1 mv. so that this requirement of accuracy will be in the order of occurring disturbing phenomena such as capacitive and galvanic crosstalk, retroaction via the supply circuit, voltage losses in the supply tracks and the like.

In accordance with the invention the above-given requirements which are technically very strict are satisfied by the combination of the following measures:

1. Each shift register element 15–26 in the form of a bistable trigger is constructed to form a topologic unit together with the attenuation network 28–39 connected to the output circuit of the bistable trigger.
2. The shift register elements 15–26 and associated attenuation networks 28–39 constructed to form topologic units along which a shift frequency track 48 is led connected to the connecting points 44 for the shift frequency, are distributed over mutually parallel rows having a limited number of topologic units which parallel rows are mutually bounded by parallel supply tracks 49–53 which are alternately connected through collective supply tracks 54, 55 facing each other to the supply connecting points 46, 47 having a different potential. The points of connection between the shift register elements 15–26 and the shift frequency track 48 are diagrammatically shown in FIG. 2 by transverse pieces on the shift frequency track 48.
3. The bistable triggers 15–26 incorporated in the topologic units are of the constant supply current loading type, that is to say, these bistable triggers carry the same supply current in the two stable states. To be able to handle high pulse frequencies bistable triggers without saturation phenomena in the transistor are advantageously used, in particular bistable triggers of the emitter-coupled type as will be shown in greater detail in FIG. 4. Particularly for the embodiment integrated in a semiconductor body the described bistable trigger of the emitter-coupled type is particularly suitable due to the low number of transistor so that the dissipation may be maintained very low.
4. The attenuation networks 27–39 associated with the various topologic units are connected to the combination device 56 through a combination track 56 which is common for all attenuation networks 27–39.

In accordance with the basic circuit diagram of FIG. 1 the output voltage of the pulse regenerator 12 is applied to the digital filter which is controlled through the shift frequency track 48 by the shift frequency and is fed by the output voltage of the switching modulator 2 while the output circuit of the pulse regenerator 12 is connected through an attenuation network 27 to the combination track 56. The pulses from the pulse source 1 are applied to the input of the switching modulator 2 through connecting point 43, and through carrier tracks 57, 58 carrier oscillations which differ 180° in phase and are derived from the cascade circuit of the two-to-one dividers 3, 4, the two-to-one divider 3 being controlled through the connecting point 44 by the central pulse generator 5 and the two-to-one divider 4 being controlled by the two-to-one divider 3. The output voltage of the transmission device integrated in a semiconductor body is derived from the connecting point 59 on the combination resistor 40, said output voltage being applied for further transmission to the output amplifier not shown in the figures.

In the transmitter shown the pulse signal modulated on a rectangular carrier oscillation in the switching modulator 2 are applied after pulse regeneration in the pulse regenerator 12 to the digital filter which is composed of the spatially separated topologic units of the bistable triggers 15–26 and the associated attenuation networks 28–39, the information contents of the shift register elements 15–26 formed by the bistable triggers being shifted under the control of shift pulses through the shift frequency track 48 which meanders along the topologic units 15,28;-; 26,39 located in parallel rows. Independent of their information contents the bistable triggers 15–26 will always device the same supply current from the supply tracks 49–53 which are located between the topologic units 15,28;-; 26,39 located in parallel rows. The output voltages of the attenuation networks 27–39 are then applied for further transmission to the combination resistor 40 through the combination track 56 which likewise meanders at a slight distance from the shift frequency track 48 along the topologic units 15,28;-;26,39 located in parallel rows.

In addition to a well-ordered structure of the transmission device integrated in a semiconductor body shows in FIG. 2 an optimum transmission quality of the output signals derived from the combination resistor 40 is obtained and particularly crosstalk phenomena are reduced to a great extent as will now be explained in greater detail.

First of all, possibly disturbing influences of connection tracks are prevented by arranging the shift register elements 15–26 in the form of the bistable triggers and the associated attenuation networks 28–39 to form topologic units in an extremely structure, while also sufficient space has been introduced between the attenuation networks 27–39 due to the spatial separation of the topologic units so as to minimize mutual crosstalk phenomena, which may be both of a capacitive and a galvanic nature. At the same time crosstalk phenomena between the topologic units through the common tracks, particularly the supply tracks 49–53, are prevented due to the choice of bistable triggers 15–26 of the constant supply current loading type, since, independently of their information contents the bistable triggers always carry the same supply current.

Thus a great reduction of crosstalk between the topologic units is achieved and the overall crosstalk problem in the transmission device according to the invention is reduced to the capacitive and gavanic crosstalk from the different elements such as, for example, topologic units and shift frequency track 48 to the combination track 56. Furthermore crosstalk may be reduced in a particularly simple manner by making the spatial distance between these elements and the combination track 56 sufficiently large. Particularly the transmission device shows low crosstalk, where the ratio of the surface of the sides of the shift frequency track 48 and of the combination track 46 facing each other on the one hand to their mutual distance on the other hand, taking into account the relative dielectric constant, is kept small with respect to $2.10^6$ $\mu$m., for example, in the embodiment shown this quantity is $16.10^4$ $\mu$m. Even at frequencies which are higher than 10 MHz. the overall crosstalk to the combination resistor 40 is found to be substantially negligible; particularly, it is less than −30 db.

To achieve the required insensitivity to interference signals which, as described hereinbefore, must at any rate be smaller than one hundredth of 1 mv., the influence of other disturbing phenomena, in addition to crosstalk, is also reduced to a great extent due to the described structure of the integrated transmission device, and especially to be mentioned are the mutual differences in the supply voltage of the bistable triggers 15–26 in the various topologic units as a result of the supply voltage losses in the supply tracks 49–53. For example, these supply voltage losses are in the order of 50 mv. for a supply current of 5 ma. per topologic unit. Due to the embodiment of the supply system described wherein the supply tracks 49, 51, 53 and the supply tracks 50, 52 located therebetween are connected to the supply connecting points 57, 46 of −1.5 v. and v., respectively which points face each other, these mutual difference in the supply voltages are compensated for to a great extent since in fact the potential along the supply tracks 49, 51, 53 will decrease in a negative sense starting from the supply connecting point 47 and the potential along the supply tracks 50, 52 will increase in a negative sense starting from the supply connecting points 46 so that as a first approximation the supply voltages of the different bistable triggers 15–26 are mutually substantially equal.

The described effect of the supply system, consisting of the reduction of the mutual differences in the supply voltages of bistable triggers 15–26, is still further enhanced by using the bistable triggers 15–26 of the emitter-coupled type since, as already described hereinbefore, a constant supply current is carried up by these bistable triggers 15–26. Thus, for example, in the embodiment shown the mutual differences in the supply voltages of the bistable triggers 15–26 are reduced to 5 mv. In addition to the advantage described and the property of small dissipation, which is important for integration in a semiconductor body, this type of bistable triggers 15–26 has the advantage of a very short transition time so that very high frequencies can be handled, for example, more than 30 MHz.

Together with a well-ordered structure, the combination of the steps described enables the applicant to realize a transmission device integrated in a semiconductor body, in which the very strict requirements with respect to sensitivity to occurring disturbing phenomena such as capacitive and galvanic crosstalk, retroaction through the supply circuit and voltage losses in the supply tracks, are completely satisfied for the first time. In its use the transmission device according to the invention is universally suitable for the different methods of modulation such as amplitude modulation, phase modulation and frequency modulation and the different methods of transmission such as double sideband, vestigial sideband and single sideband transmission, it being possible to use the different integration techniques for its construction, for example, in addition to the embodiment shown in FIG. 2 employing single-layer wiring, it is alternatively possible to use the embodiment employing multilayer wiring for which the same steps and considerations apply.

To further enhance the quality of transmission the combination resistor 40 is provided near the center of the combination track 56. As a result the resistors of the combination track 56 as reckoned from the combination resistor 40 to attenuation networks of equal magnitude located on either side thereof are rendered mutually equal every time with the result that the linear variation of the phase-versus-frequency characteristic is not influenced by the small resistance of the combination track 56. Exactly the phase-versus-frequency characteristic, which is essential for pulse transmission, is extremely sensitive to small differences in resistance so that an optimum transmission quality is obtained by the step described.

Figure 3:
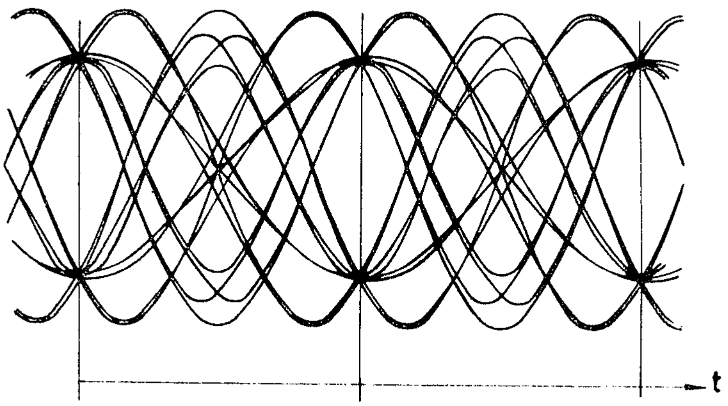

Extensive experiments have proved that when the frequency of the central pulse generators 5 of FIG. 1 is increased, thus when broadening the transmission bandwidth, the optimum quality of transmission is completely maintained. This is even found to apply for the extremely high pulse frequency of 5 MHz. at which the waveforms shown in FIG. 3 are maintained. Furthermore, the transmission device described is found to have a remarkable temperature stability, for example, at a transmission speed of 2,400 Baud the waveforms according to FIG. 3 are maintained over a temperature range of −80° C. to +100° C. The dimensions of this transmission device are 2.1×2.7 mm. while the number of transistors and resistors is 203 and 172, respectively.

As will be further explained with reference to FIG. 4, the starting point in the practical construction of the different elements of the transmission device in FIG. 2, namely bistable triggers, two-to-one dividers and switching modulator is a common structural element which is an advantage especially in manufacture. Thus, for example, the high yield of at least 30 percent is found to be achieved in the manufacture of the transmission device described.

FIG. 4*a* shows the structural element with which, as will be explained, the bistable triggers, the two-to-one dividers and the switching modulator of the transmission device described are formed. An OR gate according to FIG. 4*a* has been chosen as a structural element. This OR gate includes the input transistors $T_1$ and $T_2$ whose base electrodes form the inputs $x_1$ and $x_2$, respectively, of the gate. The emitter electrodes of the input transistors $T_1$ and $T_2$ are connected through a common resistor $R_1$ to a point of constant potential $E_1$ while the collector electrodes of the input transistors are likewise connected through a common resistor $R_2$ to a point of constant potential $E_2$ which is higher than the potential $E_1$, for example, $E_1$=−1.5 v. and $E_2$=0 v. The collector electrodes of the input transistors $T_1$ and $T_2$ are also connected to the base electrode of a transistor $T_4$ arranged as an inverter whose emitter electrode is connected to the emitter electrodes of the input transistors $T_1$ and $T_2$. The collector electrode of transistor $T_4$ is connected through a resistor $R_3$ to a point of constant potential. The number of inputs of the OR gate according to FIG. 4*a* can be extended in a simple manner. If it is desired that the OR gate has three inputs, an additional input transistor $T_3$ is added as is shown by a broken line in FIG. 4*a*. The emitter electrode of this transistor is connected to the emitter electrodes of the other input transistors $T_1$ and $T_2$ and the collector electrode of this transistor $T_3$ is connected to collector electrodes of the other input transistors $T_1$ and $T_2$. The base electrode of the additional input transistor $T_3$ then becomes the input $x_3$ of the OR gate. The logic output signal of the OR gate may be derived both from the collector electrode of transistor $T_4$ which forms the output Q of the OR gate and from the collector electrode of the transistor $T_1$ which forms the output $\overline{Q}$ of the OR gate. The logic signal occurring at the output Q is the inverse of the logic signal occurring at the output $\overline{Q}$. The output $\overline{Q}$ will be referred to as the OR output and the output Q will be referred to as the NOR output in the further description.

The OR gate shown in FIG. 4*a* is of the emitter-coupled type (ECL-logic). This kind of OR gate generally has few transistors as compared with OR gates of different types. Since the OR gate includes few transistors it is extremely suitable for use as a structural element in the transmission device according to FIG. 1. The dissipation of the transmission device can now be maintained low which is especially important when the transmission device is integrated in a semiconductor body. The OR gate according to FIG. 4*a* has the additional property that an extra logic function is created when the OR outputs of two identical OR gates are connected together. In fact, an extra AND function is created at the junction of the two OR gates. This has the advantage that AND gates may be economized and hence the number of transistors required. As a result it is possible to maintain the dissipation of the transmission device still lower.

Figure 4B:
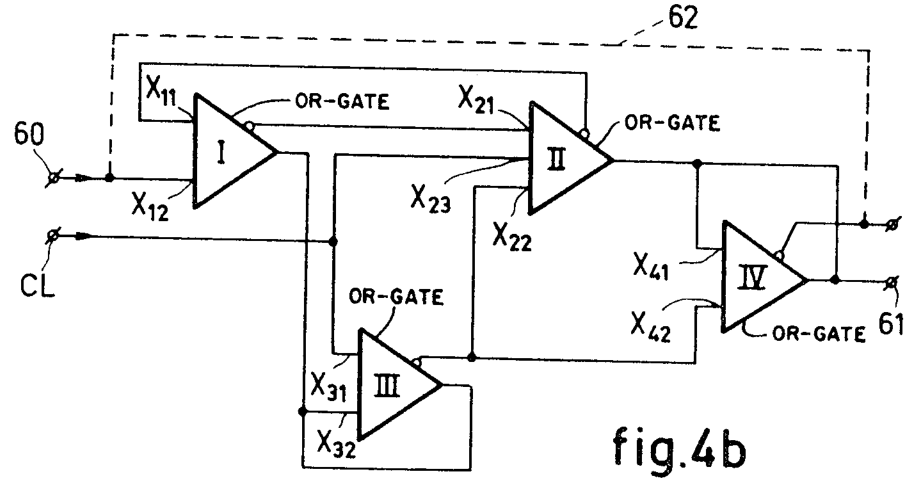

FIG. 4*b* shows a bistable trigger as used in the transmission device according to FIG. 1 and FIG. 2, for example, the bistable trigger 25 of FIG. 2. The bistable trigger includes the OR-gates I, II, III, and IV. The input $x_{12}$ of the OR-gates I also forms the signal input 60 of the trigger 25. The input $x_{11}$ of the OR gate is connected to the NOR output of the OR-gate II. The NOR output of the OR-gate I is connected to the input $x_{21}$ of the OR-gate II while the OR output of the gate I is connected to the input $x_{32}$ of the OR-gate III, which input $x_{32}$ is also connected to the OR output of the OR-gate III. The input $x_{23}$ of the OR-gate II is connected to the input $x_{31}$ of the OR-gate III while the said two inputs are also connected to the clock-pulse input CL of the trigger which clock-pulse input is connected to the shift frequency track 48 when it is used as in FIG. 2. The output $x_{22}$ of the OR-gate II is connected to the NOR output of the OR-gate III and also to the input $x_{42}$ of the OR-gate IV. The OR output of the gate II is connected at one end to the input $x_{41}$ of the gate IV and at the other end to the OR output of gate IV.

The bistable trigger shown in FIG. 4*b* is an "edge controlled" delay flip-flop, the operation of which is as follows. When the clock-pulse signal supplied to the clock-pulse input CL of the trigger goes from 1 to 0, hence during the 1/0 edge of a clock pulse, a logic 1 will be supplied to the NOR output of the gate IV if a logic 1 is supplied to the signal input 60 at the instant when said 1/0 edge is present. During the 1/0 edge of a clock pulse a logic 0 will be supplied to the NOR output of the gate IV if a logic 0 is supplied to the signal input 60 at the instant when said 1/0 edge is present.

The bistable trigger shown in FIG. 1 may be arranged as a two-to-one divider in known manner. To this end the NOR output of the OR-gate IV is interconnected to the input $x_{12}$ of the OR-gate I which is also input 60 of the trigger as is shown by the broken line 62 in this Figure.

Figure 4C:
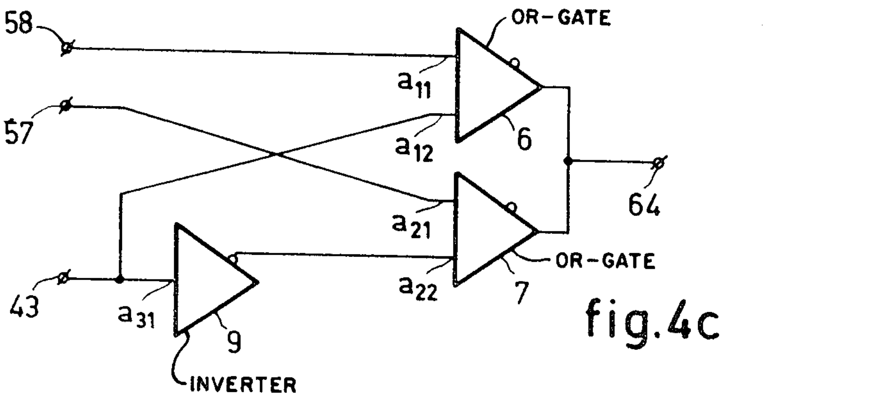

FIG. 4*c* shows the structure of the switching modulator wherein the structural elements of FIG. 4*a* are used. The modulator includes the inverter 9 and the two OR-gates 6 and 7. The input $a_{31}$ of the inverter 9 forms the signal input of the switching modulator and is connected to the connecting point 43 to which the pulses from the pulse source 1 of FIG. 1 are applied . The input $a_{31}$ of the inverter is also connected to the input $a_{12}$ of gate 6. The NOR output of the inverter 9 is connected to the input $a_{22}$ of the gate 7. The inputs $a_{11}$ and $a_{21}$ of the gates 6 and 7, respectively, constitute carrier signal inputs which are connected to the carrier tracks 58 and 57, respectively. The two OR outputs of the gates 6 and 7 are connected together and this junction also constitutes the output of the switching modulator.

FIG. 5 shows a plan view of an integrated embodiment of the bistable trigger as is used in the transmission device according to FIGS. 1 and 2 and the associated attenuation network. In this case the plan view of, for example, the topologic unit 25 and the attenuation network 38 of FIG. 2 is referred to. The Figure shows a number of semiconductor regions 101–107 which are isolated from one another wherein one or more transistors are provided in conventional manner which are denoted by a base zone 108, emitter zone 109 and a collector contact zone 110. The isolated semiconductor region 111 includes resistors 114 which correspond to the resistor $R_1$ of FIG. 4*a*, while the semiconductor region 112 includes resistors 117 which correspond to the resistors $R_2$ and $R_3$ of FIG. 4*a*. The isolated semiconductor region 113 includes the previously mentioned attenuation network wherein the resistor 118, the resistor $R_3$ (FIG. 4*a*) of the gate IV (FIG. 4*b*) and the resistor 119 constitute a weighting resistor, the magnitude of which is adapted to the position of the relevant shift register element in the shift register, in other words, to the desired transfer coefficient.

The semiconductor surface is coated with an insulating layer which is considered to be transparent in FIG. 5 and wherein a number of apertures or windows are provided which are shown by broken lines in FIG. 5. This insulating layer has a pattern of conductor tracks which establish contacts through the said apertures with the semiconductor zones located in situ on the surface. A number of these conductor tracks serves for the mutual interconnection of the switching elements of the shift register element. For the sake of clarity only a few of them are shown in FIG. 5 by the reference numeral 120. The parallel supply tracks 52 and 53, the shift frequency track 48 and the combination track 56 are denoted by the same reference numerals as those in FIG. 2.

The electrical input of the shift register element 25 is formed by the conductor track 60, while the conductor track 61 constitutes the electrical output of the shift register element.

Furthermore the semiconductor region 111 is provided with those crossunders 115, 116 through which the shift frequency track 48 and the electric input to are connected to the bases of the desired transistors. These crossunders are formed by a diffused zone 115 and a diffused zone 116 located within this zone, which diffused zones have been obtained simultaneously with the base zones and the emitter zones of the transistors. To prevent unwanted transistor action the PN junction between the zones 115 and 116 at the area of the apertures 121 is short circuited.

The part of the semiconductor body surrounding the insulated semiconductor regions is connected through the window 122 to the supply track 53, while the insulated semiconductor regions 112 and 113 are connected to the supply track 52 through the windows 123 and 124, respectively.

It was already mentioned that the topologic units formed by the bistable triggers 12 and 15–26 and the associated attenuation networks 27 and 28–39 of FIG. 2 are substantially equal to each other. It will be evident that as a result thereof the structure of the part of the device formed by the regenerator 12 and the shift register 15–26 can be derived with the aid of the unit described with reference to FIG. 5 by means of rotation and/or displacement. The only differences which occur in the said units 12 and 25–26 are the result of the differences in the transfer coefficients for the attenuation networks. A slightly changed pattern of conductor tracks is used dependent on the sign of the relevant transfer coefficient. Thus, for example, a positive transfer coefficient is associated with the unit 25, 38. In the case of a negative transfer coefficient 16, 29 the part of the shift register element located to the left of the broken line A—A shown in FIG. 5 is formed in entirely the same manner. Therefore this part has been omitted in FIG. 6. As is shown in FIG. 6 a little variation has been provided in the part located to the right of the broken line A—A in the case of a negative transfer coefficient, which variation consists in that the connections of the ends of the resistors 117 and 118 shown which are not connected to the supply track 52 are interchanged with the result that the weighting resistor 119 the magnitude of which is adapted to the magnitude of the relevant transfer coefficient is no longer directly connected to the electric output 61 of the shift register element.

Also the structure of the two-to-one dividers 3 and 4 shown in (FIG. 2) is largely equal to that of the shift register element according to FIG. 5. Apart from the combination track 56 which is absent in the two-to-one dividers, the portion of the shift register element according to FIG. 5 located between the broken lines A—A and B—B is also incorporated in the two-to-one dividers 3 and 4 (FIG. 2). The deviating portion located outside these broken lines is shown in FIG. 7. In that case the resistor 117 shown is connected through a track 120 in the same manner as in FIG. 6. Furthermore the insulated semiconductor region 113 and the resistor 119 are absent while the resistor 118 is accommodated in a separate insulated semiconductor region 124 which is located to the left of the line B—B. This resistor 118 is connected to the collector zone of the transistor shown to the left of the line B—B which transistor is provided for the sake of simplicity with a second collector contact zone 110 for this purpose. Likewise as for the shift register element of FIG. 5 the other collector contact zone 110 of this transistor is connected through a conductor track 120 to the collector contact zone 110 of the transistor located to the right of the line A—A. The connection 62 shown in FIG. 2 between one of the outputs of the two-to-one divider and the electrical input 60 is formed by the metal track 62 shown in FIG. 7 which track connects the resistor 118 to the electrical input 60.

FIG. 7 furthermore shows how the first two-to-one divider 3 is connected to the second 4. To this end also a small portion of the two-to-one divider 4 which is otherwise equal to the two-to-one divider 3 is shown wherein the line B′—B′ corresponds to the line B—B in the first two-to-one divider 3. The shift frequency track 48 of the first two-to-one divider terminates to the right of the line A—A while the electrical output 61 of the first two-to-one divider is connected to the frequency shift track 63 (see also FIG. 2) of the second two-to-one divider.

The plan view of FIG. 8 shows the structure of the modulator 2. This modulator is formed with the same kind of gates as the shift register elements 15–26 and the two-to-one dividers 3 and 4. Corresponding switching elements are denoted by the same reference numerals in FIGS. 5–8. The modulator 2 is provided between the supply tracks 49 and 50. The conductor track 57 connects one of the outputs of the two-to-one divider 4 not shown in FIG. 8 through the connecting point of contact face 45 to one of the carrier inputs of the modulator. The other output of the two-to-one divider 4 is connected through the conductor track 58 to the other carrier input of the modulator. The connecting point or contact face 43 is connected to the electrical (signal) input of the modulator. The electrical output 64 of the modulator is connected through the metal track 125 to the electrical input of the regenerator 12 which is not shown in FIG. 8. The modulator 2 furthermore includes a number of transistor which are denoted in the Figure by a base zone 108, and emitter zone 109 and a collector contact zone 110. These transistors are accommodated in the insulated semiconductor region 126–130. The modulator furthermore includes two insulated semiconductor regions 11 and 112 including resistors 114 and 117, respectively. The resistors 117 of the modulator are provided in the same semiconductor region 112 as the resistors 117 of the shift register elements 16 located on the other side of the supply track 50.

The entire topologic structure of the integrated transmission device can be explained with the aid of the FIGS. 5–8 in a simple manner with reference to FIG. 2. In this case sufficient space has been left in the center of the shift register to provide the contact face or connecting point 59 which is connected to the combination track 56 and the combination resistor 40 in a manner which is common practice in the semiconductor technique. The combination resistor 40 may be accommodated, for example, in a separate insulated semiconductor region or in the area in the semiconductor region 113 of the shift register element 20 which area is intended for the weighting resistor.

The semiconductor device described above may be manufactured entirely in a manner which is common practice in the semiconductor technique. For example, the starting point may be a P-type silicon substrate having a specific resistance of 2-5 Ohm/cm. on which an epitaxial layer of N-type silicon having a specific resistance of approximately 0.3 ohm/cm. and a thickness of approximately 5 μm. is provided, low-resistive zones being provided as so-called buried layers in the area of the insulated semiconductor regions 101–107 and 126–130 at the boundary of the P-type substrate and the N-type epitaxial layer. These low-resistive zones may be doped, for example, with arsenic and they may have a square resistance of approximately 20 ohm per square.

The epitaxial layer may be converted, for example, by diffusion of boron in P-type except for the insulated semiconductor regions with the aid of the conventional photoetching and diffusion masking techniques. Subsequently base zones 108, resistors 114, 117, 118 and 119 and the zones 115 of the crossunders may be provided in the insulated semiconductor regions, for example, likewise by diffusion of boron. The thickness of these diffusion zones is, for example, approximately 1.1 μm. and the square resistance is, for example, approximately 150 ohms per square. During the last diffusion treatment the emitter. zones 109, the collector contact zones 110 and the zones 116 of the crossunders are formed. These zones are doped with, for example, phosphor, the thickness of the zones being, for example, 0.7 μm. and the square resistance being, for example, 10 ohms per square.

The thickness of the insulating layer provided on the semiconductor surface which layer may comprise, for example, silicon oxide and/or silicon nitride is, for example, approximately 0.6 μm. For the conductor tracks which are largely located on the insulating layer or suitable contact material, for example, aluminum having a thickness of approximately 1 μm. may be used.

The integrated transmission device may be installed in conventional manner in a usual envelope, optionally together with one or more other devices such as an amplifier.

It is to be noted that many variations are possible in the integration of the transmission device. The semiconductor body may comprise, for example, germanium or an $A_{III}B_{V}$ compound. The insulated semiconductor regions may be insulated from each other in a manner other than with the aid of PN junctions. For example, the semiconductor body may comprise an insulating substrate provided with mutually separated semiconductor regions. Furthermore the resistors or part thereof may be provided on the insulating layer instead of in the semiconductor body with the aid of techniques which are otherwise common practice.

We claim:

1. A pulse transmission device integrated in a semiconductor body, comprising an output filter which is fed by bivalent pulses synchronized to a signal frequency generated by a clock frequency source, said output filter being formed from a shift register having a plurality of shift register elements each having an output and each comprising a bistable trigger of the constant supply current loading type said shift register elements being shifted by a shift frequency signal having a frequency which equal to an integer multiplied by the frequency of the clock frequency source, a plurality of attenuation networks each coupled to respective outputs of the shift register elements and each comprised of a resistor, a combination device, means to couple the attenuation networks to the combination device, connecting points on the semiconductor body to receive the bivalent pulses and the shift frequency signal, and supply connecting points on the semiconductor body having different potentials, each of said shift register elements and respective attenuation network being formed as a topologic unit in the semiconductor body, said topologic units being distributed in parallel rows along which a shift frequency track meanders and which are mutually bounded by parallel supply tracks that are alternately connected through collective supply tracks parallel to each other and connected to the supply connecting points, said coupling means comprising a combination track which is common for the attenuation networks.

2. A device as claimed in claim 1, wherein the combination device is provided near the center of the combination track which is common for attenuation networks.

3. A device as claimed in claim 1, wherein the bistable triggers incorporated in the topologic units are formed with selection gates of the emitter-coupled type.

4. A device as claimed in claim 1, wherein that quantity determined by the ratio of the surfaces of the sides of the shift frequency track and the combination track near each other to their mutual distance is smaller than $2.10^6$ $\mu$m.

5. A device as claimed in claim 1, wherein the different elements of the transmission device are formed with a common structural element including at least two transistors the emitter electrodes of which are connected together, the base electrode of one of the transistors being connected to the collector electrodes of the other transistors.

* * * * *